Feb. 2, 1954            C. A. HAHN            2,667,807
HEAT FILTER FOR INTERMITTENT LIGHT BEAM PROJECTORS
Filed March 10, 1948                          2 Sheets—Sheet 1
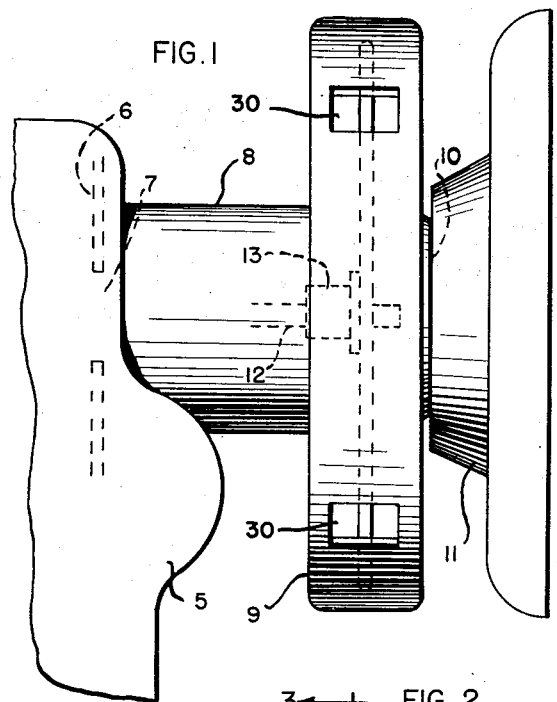
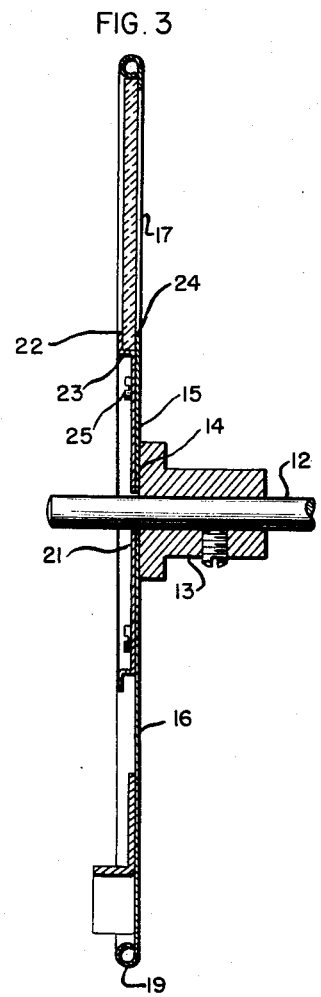
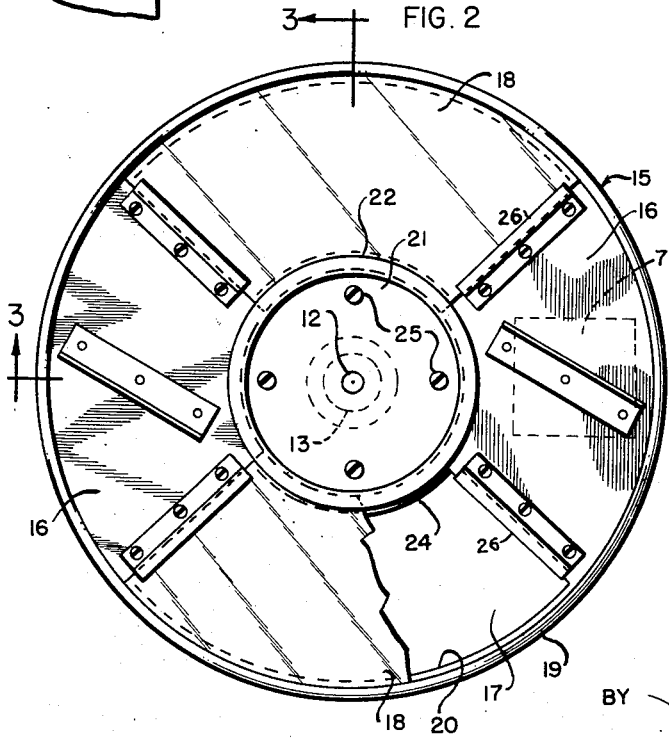
INVENTOR
CHARLES A. HAHN
BY
ATTORNEY

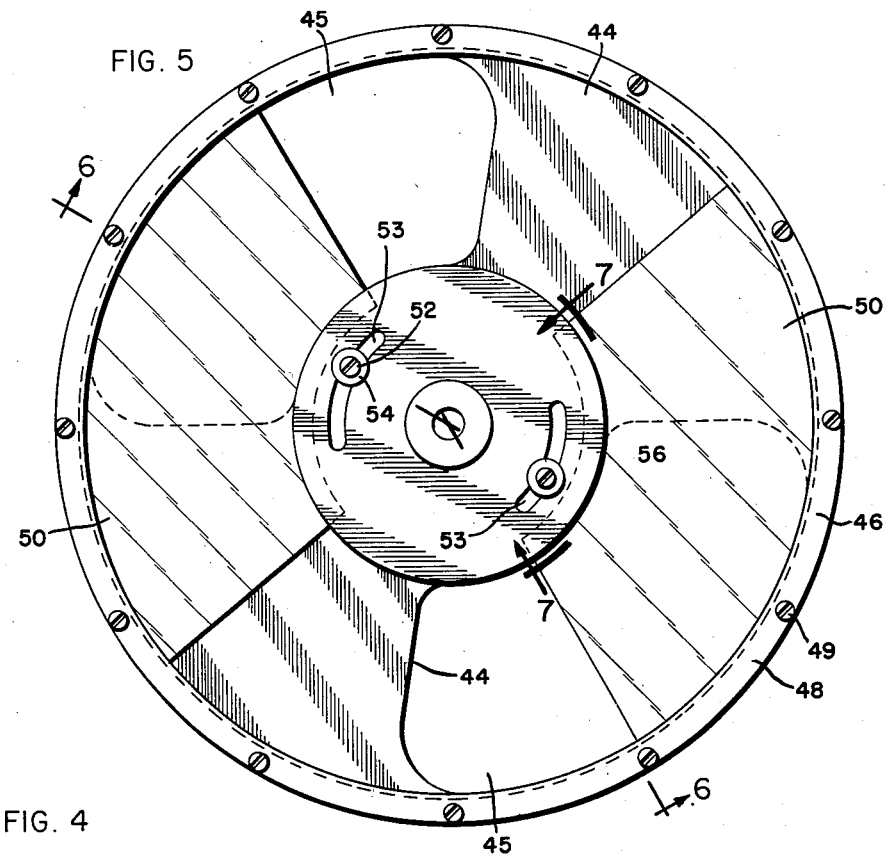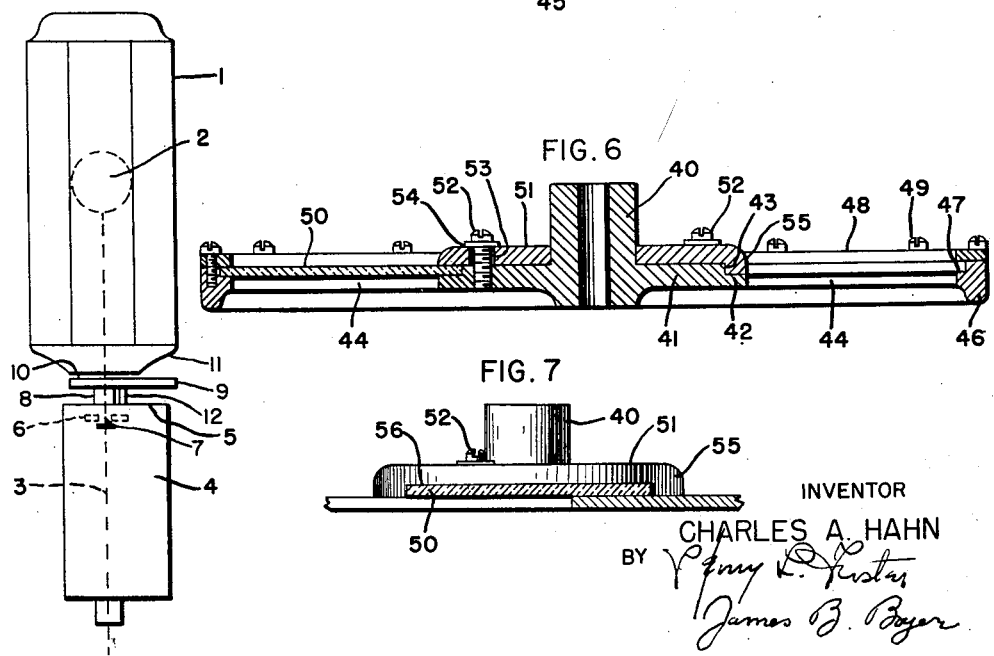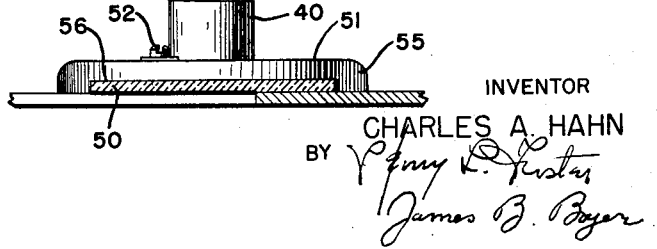

Patented Feb. 2, 1954

2,667,807

UNITED STATES PATENT OFFICE 2,667,807

HEAT FILTER FOR INTERMITTENT LIGHT BEAM PROJECTORS

Charles A. Hahn, Chicago, Ill., assignor to J. E. McAuley Mfg. Co., Chicago, Ill., a corporation of Delaware Application March 10, 1948, Serial No. 14,068

5 Claims. (Cl. 88—17.)

1

This invention relates to devices for projecting light beams and is particularly directed to the problem of filtering heat rays from a light beam that is to be projected. In one of its important aspects, the invention is directed to filtering heat rays from a light beam that is to be projected intermittently, and in another aspect it is concerned with provision of a variable light heat filtering arrangement capable of accurate adjustment to the heat content of a light beam with which it is to be used, so that the degree of filtering may be limited to that necessary to reduce the heat content of the beam to the desired level, while avoiding excessive filtering action and the unnecessary loss of visible light accompanying it.

A typical use of the invention, which may make full use of both aspects noted above, is in motion picture projection, particularly in the professional field, wherein light beams of very high intensity are used and pictures are projected from film that is readily damaged by exposure to light beams having heat contents in excess of definite intensities. In such projectors the light beam customarily is produced by a high intensity source, such as an arc, in a lamp house arranged to the rear of the projector proper, and the beam is directed past a shutter, that interrupts it periodically, to the projector aperture and optical system. Such high intensity beams have heat contents far in excess of the intensities that film is capable of withstanding, even during the brief exposure periods necessary for projection, so it is universal practice to abstract heat from the light beam before the beam reaches the projector aperture where it strikes the film.

Prior practice in abstracting heat from the light beam of a projector has been to place between the light source and the projector a heat filter comprising a body of ceramic or vitreous material having characteristics of absorbing a high percentage of the heat rays of the light beam and transmitting a high percentage of its visible light. Such bodies are constantly exposed to the light beams that they filter. Because of the high intensity of light beams used in such projectors it has become common practice to cool such heat filters by directing flows of heat absorbing fluids over their surfaces, thereby abstracting heat from them at a faster rate than it can be dissipated by radiation, and keeping the filter bodies at temperatures that they are capable of withstanding.

There is a constant trend in intermittent light beam projectors toward use of higher light intensities, and this trend has raised the problem solved by the present invention. Increase in light intensity is accompanied by increased intensity of the heat content of the beam. Heat filtering material used in arrangements of the conventional type described above have definite limitations as to the intensity of heat that it is capable of absorbing and dissipating, and the light intensities of the beam at present commonly used in commercial motion picture projection are such that they are accompanied by heat intensities practically at the limits of the capacities of standard filtering assemblies. Increase of light intensity beyond those now employed is accompanied by raising the heat filtering bodies to red heat, resulting in their destruction by sagging or cracking.

The present invention solves the problem of adequate filtering of light beams of intensities beyond those which a body of ceramic or vitreous filtering material constantly exposed to such a beam can withstand, by so arranging the filtering assembly that the filtering material is exposed to the light beam only during the periods that the beam actually is being projected, thereby materially limiting the time during which the material absorbs heat, and consequently limiting the temperature to which the filtering body is raised. Additional limitations of the temperature to which the filtering material is raised is accomplished by moving the filtering material during its exposure to the beam, thus distributing the heat removed from the beam over an area of the material larger than the cross sectional area of the light beam, and by presenting different filtering bodies to the beam during successive projection periods.

In intermittent projectors equipped with shutters arranged between the light source and the projection aperture, such a movable light filter as herein disclosed may be combined with the shutter structure by so mounting one or more bodies of heat filtering material, according to the type of shutter, that such a body is interposed in the path of the beam when the shutter is in a position to pass the light beam to the projector, and removed from the path of the beam when the shutter obstructs such path. As a refinement, the heat filtering material may be so mounted as to be interposed in the path of the beam for only a part of each projection period while the shutter is in position to pass the beam, and additionally the filtering material may be adjustable on the shutter so the relative lengths of the parts of the projection periods when the light beam is filtered and unfiltered may be selected in accordance with the heat content of the particular beam with which an assembly is to be used, and with the permissible level of the heat content of such beam as it enters the projector.

In explanation of the partial and adjustable filtering features of the invention, it may be explained that commercially available ceramic or vitreous material absorbs a certain percentage of the visible light ray content of the light beam as well as a much higher percentage of the heat ray content. With arc beams of the intensities used in standard modern professional projection, filters are used which abstract approximately eighty per cent of the heat content and absorb approximately twenty-two per cent of the visible light rays. These percentages constitute a compromise between the opposed desirable effects of high heat abstraction and transmission of as much visible light as possible. It will be apparent that in case a light beam of lower intensity is used in a given installation, removal of less than the indicated maximum of eighty per cent of the heat rays may reduce the heat content of the beam to a satisfactory level, so that filtering of the maximum heat content from the beam is accompanied by a greater than necessary loss of light. Consequently, a reduction of the filtering effect is accompanied by an increase in the projected visible light. As indicated, the present invention provides for such reduction from maximum heat filtering by limiting the filtering action to occur during only a part of each projection period. During the remainders of such periods the absorption of visible light due to filtering is avoided, so the total useful illumination of the projected beam is increased.

It is the primary object of the invention to provide a novel method and apparatus for abstracting and dissipating heat from the light beam of an intermittent projector by means of standard ceramic or vitreous filtering material, which will permit use of light beams having heat intensities beyond those that such materials are capable of withstanding when used in present types of heat filters.

Another object is the provision of a novel heat filtering assembly for the light beam of an intermittent projector, so arranged that the heat filtering material is exposed to the light beam only during periods of actual projection of the beam from the projector.

A further object is the provision of such a novel heat filtering system that requires a minimum alteration of standard type projection equipment to permit installation of the novel heat filtering system instead of conventional heat filtering systems.

A further object is the provision of a novel heat filtering assembly for a projector light beam, providing for partial filtering of a light beam to permit saving of visible light ray content of the beam when heat filtering to the maximum extent is not necessary.

An additional object is the provision of a novel heat filtering assembly for a projector light beam providing for adjustment of the degree of filtering performed by the assembly.

Another object is the provision of novel structural and mechanical arrangements for accomplishing the desirable heat filtering according to the basic concepts of the invention.

While a great many mechanical means might be used to limit exposure of a heat filtering body to a light beam only during periods of actual projection of such beams by an intermittent projector, such result may be accomplished very conveniently, and with minimum alteration of standard projection equipment, by combining one or more movable bodies of heat filtering material with the light beam interrupting shutter of the projector. By arranging the heat filtering bodies in coincidence with the light passing parts of the shutter, the desired result is automatically accomplished in a highly desirable way.

Such an arrangement is shown in the accompanying drawings wherein:

Fig. 1 is a fragmentary side elevation of part of a projector, embodying the invention, and part of a light source.

Fig. 2 is an elevation of one form of heat filter assembly arranged in accordance with the invention.

Fig. 3 is a sectional view on line 3—3 of Fig. 2.

Fig. 4 is a diagrammatic plan of light source and motion picture projector assembly provided with a filter of the type herein disclosed and showing the relation of such filter to the assembly.

Fig. 5 is a front elevation of a heat filter and shutter assembly modified to permit adjustment of the degree of filtering to be performed by the assembly.

Fig. 6 is a sectional view on line 6—6 of Fig. 5.

Fig. 7 is a fragmentary sectional view on line 7—7 of Fig. 5.

Describing the drawings in detail and referring first to Fig. 4, a lamp house 1 contains a high intensity light source 2, such as an arc lamp and reflector, arranged to direct a high intensity light beam along the optical axis 3 of a motion picture projector 4.

In Fig. 1 a rear portion of the motion picture projector 1 is designated 5, and includes structure 6 forming an aperture 7 through which the beam of light is directed to the interior of the projector and upon a film at the aperture. A tubular casing 8 extends rearwardly from the projector, surrounding the axis 3 of the aperture 7, and through which the beam of light is directed upon the aperture. At the rear end of the tubular casing 8 is mounted a shutter housing 9, which is in eccentric relation to the aperture axis, and which has an end opening at 10 in alignment with the aperture 7 for admission of the light beam. The end structure 11 of the arc lamp house is disposed in matching alignment with the opening 10, so that the light beam from the arc lamp is coaxial with the opening 10 and aperture 7.

A heat filtering assembly which also operates as a shutter to produce the intermittent character of the light beam necessary for motion picture projection is enclosed by the housing 9, and is shown in detail in Figs. 2 and 3. The assembly is carried by a rotary drive shaft 12, which may be driven in well known manner from the projector mechanism. Adjacent the end of the shaft 12 is a hub 13, having a flat end surface 14. A circular plate 15 is secured to this end surface 14 and extends radially and transverse to the light beam for rotation of an annular portion of the plate, lying between the margin of the surface 14 and the edge of the plate, through the light beam at a point between the opening 10 and the aperture 7.

Prior practice has been to interpose a heat filtering assembly between the end structure of the lamp house, as 11, and the light opening of the shutter casing, as 10, so that the heat filtering material of such assembly is constantly exposed to the light beam and filters the heat from the beam before its passage to the usual shutter arranged at the location of the assembly described above.

In the instant assembly the shutter plate 15 comprises opaque sectors 16, and one or more cut out portions or gaps 17, so that as the plate rotates across the light beam, the latter alternately is interrupted by the portions 16 and passed by the gaps 17. The gaps 17 are masked by bodies 18 of transparent heat filtering material. Such material is well known in the art, generally comprising heat resistive glass having a capacity for absorbing a high percentage of the heat frequencies, while transmitting a high percentage of the visible frequencies of light beam directed upon the normal to its surface.

To secure the bodies 18 to the plate 13, the latter is provided with a rim 19 which extends arcuately across the cutout regions 17, and preferably comprises a rolled rim extending circumferentially of the whole plate, and projecting axially therefrom on the side upon which the bodies 18 are mounted. Preferably the cutouts terminate a short distance inwardly of the rim, leaving narrow strips 20 bridging their outer sides. To the central portion of the plate 15 is secured a keeper plate 21, having a fin 22 spaced axially from the surface of the plate 15 by a flange 23 and extending along the corresponding inner margin 24 of each cutout. Preferably the plate 21 comprises a circular plate coaxial with the plate 15, and the inner edges of the cutouts are arcuate, and substantially in axial registration with the edge of the fin 22. The transparent bodies 18 have convex arcuate outer edges contacting the inner surface of the rim 19 and bearing upon the bridge portion 20, while their inner edges are concave and engaged between the fin 22 and the surface of plate 15. The plates 15, 21 are detachably secured together as by screws 25. The side edges of the bodies 18 may be secured by radially disposed Z bars 26 having base flanges 27 secured detachably to the plate 15, and flanges 28 overlying the edge portions of the bodies. Such bars prevent relative angular movement between the bodies 18 and the assembly of plates 15, 21.

In view of the relatively high heat absorption of the heat filtering bodies 18, due to their interruption of heat rays, and the portions 16 of the shutter plate due to their interruption of the entire light beam, means is provided for moving air over the surface of the assembly to cool it. This may be accomplished by a flow of cooling fluid produced by a conventional cooling arrangement, or by providing the plate 15 with air moving blades. In the present assembly these are shown as angle bars 29 disposed on chords of the circular margin of the plate 15, and having webs 30 projecting axially and serving as fan blades during rotation of the assembly. Inlet and vent openings 30 are provided in the shutter housing 9 in any suitable arrangement.

It will be readily appreciated that in addition to protection of the heat filtering material during periods when the beam is cut off from the projector, provision of a moving transparent heat filter for a light beam greatly reduces concentration of heat absorption per unit area, as compared to a stationary heat filtering body, an area of which corresponding to the cross section of the light beam, is exposed to the beam and absorbs the entire abstracted heat of the beam.

Additionally it will be apparent that the distribution of heat absorption throughout the annular region of the shutter assembly that passes through the beam reduces the volume flow rate of cooling fluid necessary to prevent excessive heating of the assembly, so that adequate cooling may be accomplished by fan blades mounted on the shutter plate. Finally, the combination of shutter, moving heat filter and fluid-moving means in a single assembly provides maximum efficiency in use of power consumed. These features cooperate in permitting use of light beams producing heat intensities beyond the capacities of present systems of heat filtering and cooling.

As indicated above, it may be desirable to limit the filtering action to occupy only a part of each projection period, and additionally to provide for variation of the length of such parts of the projection periods to permit adjustment to the heat content of a particular light beam which content requires less filtering than the maximum of which the assembly is capable. The modified shutter and filter assembly of Figs. 5 to 7 provides for such partial filtering and adjustment.

The assembly is mounted on a hub 40 including a circular plate 41 the marginal portion of which is provided with a circumferential flange 42 of reduced thickness providing a shoulder 43. Shutter blades 44 project radially from the edge of the flange at angular intervals, being separated by gaps 45 that constitute light passing apertures. At their ends the blades 44 carry a circular rim 46 having an internal shoulder 47 that provides a surface on a common plane with the corresponding surface of the flange 42.

An annular keeper plate 48 is secured to the rim 46, as by screws 49, overlying the shoulder 47 and with it forming a groove wherein are received the outer marginal portions of sector shaped plate-like bodies 50 of the vitreous or ceramic heat filtering material. The grooves are so related to the thickness of these bodies 50 that the latter are slidable, for angular movement relative to the axis of the hub.

A keeper plate 51 is secured to the hub plate 41 for limited rotation thereon, being secured by headed screws 52 threaded into the plate 41 and projecting through arcuate slots 53 in the keeper plate. Washers 54 overlie the latter plate for securing the relative angular positions of the two plates when the screws 52 are tightened.

The keeper plate 51 has an axially offset annular flange 55 that surrounds the body of the hub plate 41 and contacts the shoulder 43 and surface of the flange 42. This flange 55 is provided with gaps 56 that receive the inner end portions of the filter bodies 50, as best shown in Figs. 6 and 7. By rotating the keeper plate 51 on the hub plate 41 the angular position of the filter bodies 50 is changed relative to the light gaps 45 of the shutter, so that the extent to which they mask such gaps may be selected. The selected positions of the filter bodies may be fixed by tightening the screws 52.

It will be seen that the invention is based on the concept of moving a body or bodies of filtering materials through the light beam in synchronism with periods during which the light beam is being projected, and protecting the filtering material against absorption of heat by removing it from the beam during periods when the beam is not being projected. In this manner the commercially available and commonly used vitreous or ceramic light filtering material, which has definite limits of temperature to which it can be raised, can successfully be used with beams of light having such heat content intensities that the material cannot be continuously exposed to them without damage by excessive heating. This provision for extension of the range of beam intensities is definitely related to the ceramic or vitreous material referred to throughout the foregoing description, since such material is at present considered as providing ideal filtering, being of uniform light-transmitting quality throughout its area as distinguished from screens of opaque material, such as metal, provided with apertures for transmitting limited parts of the light beam. Such screens simply reduce the intensity of the light beam and reduce its heat content only in proportion to reduction of the visible light. Consequently, such screens do not perform a true filtering action. As used herein, the term "filtering material" is limited to material of the character indicated and excludes perforated or foraminous screens of opaque material.

Intermittent filtering of a light beam is not necessarily restricted to intermittent projectors, but may usefully be employed in continuous projection of a light beam by alternately filtering such beam and passing it unfiltered. This may be accomplished by interposing a body of filtering material in the path of the beam intermittently, and in intervening intervals permitting the beam to be projected unfiltered. Conveniently this can be accomplished by rotating through the path of the beam a body of the filtering material having gaps that pass through the path in alternation with such material. By making relatively adjustable the areas of the gaps and filtering material, the adjustable features described above may be utilized to obtain accurate adjustment of the heat content of a light beam that is to be projected continuously.

I claim:

1. In apparatus for projecting a beam of light intermittently including a shutter movable through the path of the light beam and having a light gap that passes through such path to provide intermittent light-passing periods; a heat filtering body of material having properties of transmitting and blocking passage of high percentages respectively of visible and heat frequencies of such light beam mounted on said support, and means for adjusting the position of said body to selectively vary an area of the gap covered thereby.

2. In apparatus for projecting a beam of light intermittently including a shutter comprising a plate rotatable through the path of the light beam and having a gap adapted to pass through such path for providing intermittent light passing periods; a heat filtering body of material having properties of transmitting and blocking passage of high percentages respectively of visible and heat frequencies of such light beam mounted on said plate and angularly adjustable relative to it about the axis of rotation for covering a selected portion of the gap.

3. In apparatus for projecting a beam of light intermittently, a heat filter and shutter assembly comprising a shutter blade, a gap and a body of heat filtering material all arranged to pass through the path of the light beam, and means for adjusting the relative positions of the heat filtering body material having properties of transmitting and blocking passage of high percentages respectively of visible and heat frequencies of such light beam relative to the gap and shutter blade for varying the relative effective areas of the gap and body of heat filtering material.

4. In apparatus for projecting a beam of light intermittently including a rotatable shutter comprising alternate blades and gaps adapted to pass through the light beam successively as the shutter rotates to provide intermittent light-passing periods; a heat filtering body of material having properties of transmitting and blocking passage of high percentages respectively of visible and heat frequencies of such light beam associated with each said gap, said bodies being mounted on the shutter and angularly adjustable about its axis of rotation to cover selectively variable areas of the gaps with which they respectively are associated.

5. In apparatus for projecting a beam of light intermittently including a rotary shutter comprising a plate rotatable through the path of the light beam and having therein a gap adapted to pass through such path to provide intermittent light-passing periods; a second plate rotatable with the first plate and angularly adjustable relative thereto about the axis of rotation, and a body of heat filtering material in fixed angular relation to said second plate and angularly adjustable with it for selectively varying an area of the gap covered by said body.

CHARLES A. HAHN.

References Cited in the file of this patent

UNITED STATES PATENTS

| Number | Name | Date |
|---|---|---|
| 1,385,162 | Tillyer | July 19, 1921 |
| 1,406,802 | Young | Feb. 14, 1922 |
| 1,525,346 | Warren | Feb. 3, 1925 |
| 1,537,315 | Lang | May 12, 1925 |
| 1,884,730 | Kindelmann | Oct. 25, 1932 |
| 1,949,477 | Kindelmann | Mar. 6, 1934 |
| 2,082,488 | Friebus | June 1, 1937 |
| 2,207,050 | Clemens | July 9, 1940 |
| 2,228,479 | O'Grady | Jan. 14, 1941 |
| 2,269,494 | Tillyer | Jan. 13, 1942 |

FOREIGN PATENTS

| Number | Country | Date |
|---|---|---|
| 480,267 | Great Britain | Feb. 21, 1938 |